United States Patent
Fernandez Galmes et al.

(10) Patent No.: US 12,438,782 B1
(45) Date of Patent: Oct. 7, 2025

(54) SYNCHRONIZATION OF NETWORK ORCHESTRATION WITH CORE SERVICE REGISTRATION PROCEDURES

(71) Applicant: Hewlett Packard Enterprise Development LP, Spring, TX (US)

(72) Inventors: Juan Manuel Fernandez Galmes, Las Rozas de Madrid (ES); Ignacio Aldama Perez, Las Rozas de Madrid (ES); Jaime Garcia Munoz, Las Rozas de Madrid (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/629,534

(22) Filed: Apr. 8, 2024

(51) Int. Cl.
*H04L 41/12* (2022.01)
*H04L 61/4511* (2022.01)

(52) U.S. Cl.
CPC .......... *H04L 41/12* (2013.01); *H04L 61/4511* (2022.05)

(58) Field of Classification Search
CPC .............................. H04L 41/12; H04L 61/4511
See application file for complete search history.

(56) References Cited

U.S. PATENT DOCUMENTS

2021/0120408 A1* 4/2021 Pazhyannur .......... H04L 63/101
2024/0236733 A1* 7/2024 Ping ...................... H04W 24/08

OTHER PUBLICATIONS

3GPP, "3rd Generation Partnership Project; Technical Specification Group Services and System Aspects; Telecommunication management; Study on management and orchestration of network slicing for next generation network (Release 15)," 3GPP TR 28.801 V15.1.0 (Jan. 2018), Technical Report, 75 pages.
3GPP,3rd Generation Partnership Project; Technical Specification Group Services and System Aspects; Procedures for the 5G System (5GS); Stage 2 (Release 18), 3GPP TS 23.502 V18.5.0 (Mar. 2024), Technical Specification, 924 pages.
3GPP, 3rd Generation Partnership Project; Technical Specification Group Services and System Aspects; Management and orchestration; Concepts, use cases and requirements (Release 17), 3GPP TS 28.530 V17.4.0 (Mar. 2023), Technical Specification, 37 pages.

(Continued)

*Primary Examiner* — Minh Chau Nguyen
(74) *Attorney, Agent, or Firm* — Slater Matsil, LLP

(57) ABSTRACT

A telecommunications network includes a core network. The core network includes: a first plurality of Network Functions (NFs); and a Network Registration Function (NRF) configured to communicate with the first plurality of NFs, where the first plurality of NFs are registered with the NRF, and the NRF is configured to: receive, from an NF service consumer located outside of the core network, a request for discovery of a topology of the core network; determine, based on an authorization procedure of the core network, whether the NF service consumer is authorized to discover the topology of the core network; and send, in response to determining that the NF service consumer is authorized to discover the topology of the core network, a response to the NF service consumer, where the response comprises information regarding each of the first plurality of NFs and interconnections between the first plurality of NFs.

20 Claims, 12 Drawing Sheets

(56) References Cited

OTHER PUBLICATIONS

3GPP, "3rd Generation Partnership Project; Technical Specification Group Services and System Aspects; Management and orchestration; Provisioning; (Release 18)," 3GPP TS 28.531 V18.5.0 (Mar. 2024), Technical Specification, 87 pages.

3GPP, 3rd Generation Partnership Project; Technical Specification Group Core Network and Terminals; 5G System; Network Function Repository Services; Stage 3 (Release 18), 3GPP TS 29.510 V18.6.0 (Mar. 2024), Technical Specification, 201 pages.

3GPP, 3rd Generation Partnership Project; Technical Specification Group Services and System Aspects; Security architecture and procedures for 5G system (Release 18), 3GPP TS 33.501 V18.5.0 (Mar. 2024), Technical Specification, 330 pages.

\* cited by examiner

| Service Name | Service Operations | Operation Semantics | Function |
|---|---|---|---|
| Nnrf_TopologyDiscovery | Request | Request/Response | Management function (e.g. NFVO, NSMF, NSSMF, inventory systems) discovers from NRF the topology of the PLMN 5G network. |
| Nnrf_TopologyManagement | TopologyStatusSubscribe | Subscribe/Notify | Management function (e.g., NFVO, NSMF, NSSMF, inventory systems) subscribes to changes in the topology of the PLMN 5G network |
| | TopologyStatusNotify | | NRF notifies topology changes to management function (e.g., NFVO, NSMF, NSSMF, inventory) |
| | TopologyStatusUnSubscribe | | Management function (e.g..., NFVO, NSMF, NSSMF, inventory system) unsubscribe to changes in the topology of the PLMN 5G network |

Fig. 3

| | |
|---|---|
| Management IP Endpoint(s) | IP address(es) and port information of the Network Function (including IPv4 and/or IPv6 address) that can be used for the management of this Network Function |
| Management FQDN(s) | As an alternative to the management IP address(es); the FQDN of the Network Function used for the management of this Network Function |
| Connected NF Instances | Identifier of the Network Function instances already connected to this Network Function instance |

Fig. 4

SYNCHRONIZATION OF NETWORK ORCHESTRATION WITH CORE SERVICE REGISTRATION PROCEDURES

BACKGROUND

Network Functions Virtualization (NFV) refers to the replacement of network appliance hardware with virtual machines. The virtual machines use a hypervisor to run networking software and processes such as routing and load balancing. NFV allows for the separation of communication services from dedicated hardware, such as routers and firewalls. This separation means network operations can provide new services dynamically and without installing new hardware. Deploying network components with network functions virtualization may take hours instead of months with traditional networking. The virtualized services can run on less expensive, generic servers instead of proprietary hardware.

In Fifth-Generation (5G) telecommunications networks, NFV will enable Network Slicing. Network Slicing is a telecommunications configuration that allows multiple networks (virtualized and independent) to be created on top of a common physical infrastructure. Each "slice" or portion of the network can be allocated based on the specific needs of the applications, services, devices, customers, or operators. This topology is an essential element of the 5G architectural landscape.

Network orchestration is a way to optimize network usage and management. It combines both network automation and network management technologies and practices to facilitate end-to-end provisioning and real-time management of dynamic network structures. 5G orchestration is the process of preparing networks for new services that need, e.g., high capacity and low delay. 5G orchestration may include: Network Slicing, network resource modeling, fault supervision, assurance and performance management, trace management, virtualization management, developing execution strategies, and rolling out commercial slices.

BRIEF DESCRIPTION OF THE DRAWINGS

Aspects of the present disclosure are best understood from the following detailed description when read with the accompanying figures.

FIG. 3 illustrates new services provided by an enhanced Network Registration Function (NRF) that are used to support the topology discovery mechanism, according to some implementations.

FIG. 4 illustrates additional information sent from Network Functions to the enhanced NRF in order to support the new services provided by the enhanced NRF, according to some implementations.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
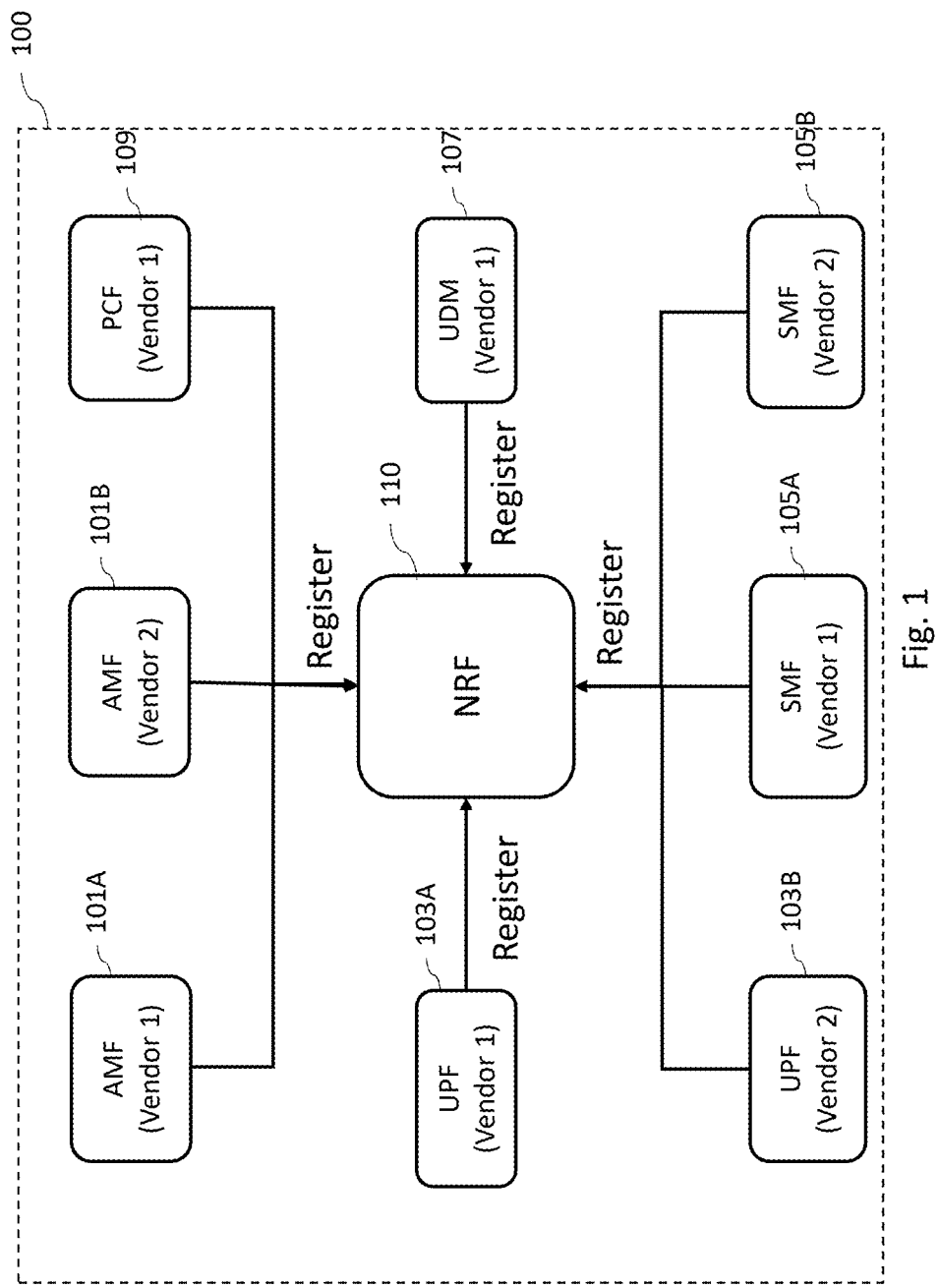
FIG. 1 illustrates registration of Network Functions in a core network of a telecommunications network, according to some implementations.

The following disclosure provides many different examples for implementing different features. Specific examples of components and arrangements are described below to simplify the present disclosure. These are, of course, merely examples and are not intended to be limiting.

Some aspects of the present disclosure are discussed using an enhanced Fifth Generation (5G) Core Network as a non-limiting example. The principle of the present disclosure may be applied to other networks, such as future generation telecommunications networks that use virtualized or containerized Network Functions. Unless otherwise specified, technical terms in the field of telecommunications or networking discussed herein without definition are defined in various standard documents, such as European Telecommunications Standard Institute (ETSI) specifications and Third Generation Partnership Project (3GPP) specifications.

When configuring and deploying a telecommunications network using virtualized and/or containerized Network Functions (NFs), different entities might be involved.

As an example, consider the case of Network Slicing in a Fifth Generation (5G) telecommunications network. In ETSI standard, as defined by ETSI Management, Automation, and Network Orchestration (MANO) in ETSI GS NFV 002 Specification, a Network Function Virtualization Orchestrator (NFVO) may be used to deploy and configure virtual Network Functions in the 5G Core Network of the telecommunications network to form, e.g., a Network Slice Subnet Instance (NSSI). The Operation Support System (OSS) of the telecommunications network is in charge of calling the NFVO when there is a need to deploy or configure Network Functions. The NFVO may deploy (e.g., instantiate) Network Functions through a Virtual Network Function Manager (VNFM).

In 3GPP standard, management functions (may also be referred to as Operation and Management (O&M) functions), such as Network Slice Management Functions (NSMFs), Network Slice Subnet Management Function (NSSMFs), are defined in the OSS of the telecommunications network. As part of the allocation of a Network Slice, the NSMF can deploy or configure Network Functions in the 5G Core Network. 3GPP states in TS 28.530 and TS 28.531 Specifications and in TR 28.801 Report that NSMF can be part of the OSS and may interact with an ETSI NFVO to perform deployment and configuration of Network Functions. In fact, ETSI MANO is aligned with this possibility as it is described in ETSI GR NFV-EVE 012.

As discussed above, for both the 3GPP and ETSI standards, theoretically there could be a common entity (e.g., the OSS) that is triggering the deployment and configuration of Network Functions in the core network and a common management function (e.g., NFVO) that has the knowledge of which Network Functions are deployed and configured in the core network of the telecommunications network.

However, the reality might be different. For example, a Communications Service Provider (CSP) might have different vendors providing Network Functions to one domain, and the management functions above the Network Functions might not be unique. For instance, there might be several NFVOs or several NSSMFs provided by multiple vendors. Each of the NFVOs or NSSMFs may make decisions to deploy a Network Function without the knowledge about the existence of other Network Functions in the core network that are deployed or configured by a different management function. Hence, there may be no guarantee that just one source-of-truth (SOT) with the knowledge of all the Network Functions deployed and configured in the core network of the telecommunications network exists.

The telecommunications industry is introducing new ways of deploying cloud native network functions (CNFs) which are not aligned with 3GPP and ETSI standards, such as Nephio initiative (see https://nephio.org/for more details). Therefore, in the same telecommunications network, an ETSI MANO NFVO and a Nephio Based Automation Function could be used by an OSS to deploy different types of Network Functions in the core network. Hence, there is yet another management function (e.g., the Nephio Based Automation Function) which is charge of deploying Network Functions and which might not be aware of what other management functions might have done.

To effectively and efficiently manage a telecommunications network, it is advantageous for the management functions to have a real-time view of all of the Network Functions currently deployed in the core network. However, the core network (e.g., a 5G Core Network) of the 5G standard (e.g., as specified by 3GPP) does not provide service for the management functions to obtain a real-time view of all of the Network Functions within the core network.

In 5G standard, the core network (e.g., a 5G Core Network) includes a Network Registration Function (NRF), which collects information from all Network Functions within the core network when the Network Functions are deployed in the core network. The NRF also minors status change of the Network Functions. The NRF provides services to other Network Functions within the core network. The services include a process for discovering instances of a Network Function of a given type providing a specific service, and a process for subscribing to changes of the Network Function instances providing the service.

However, the services provided by the NRF of 5G standard are used by Network Functions within the core network to discover NF instances and subscribe to changes of NF instances (e.g., NF instances within the core network) that are of a specific type and providing a specific service. The mechanism is intended to reduce the configuration of service endpoints in a given Network Function, allowing dynamic discovery and change updates on those endpoints. However, the services provided by the NRF of 5G standard are not available to management functions which are outside of (e.g., above) the core network (e.g., a 5G Core Network), and does not provide information of all of the NF instances (e.g., of different types and providing different services) deployed in the core network. In other words, in 5G standard, the core network does not offer service for management functions (which are outside of the core network) to know what Network Functions are currently deployed in the core network. In addition, in 5G standard, although the NRF contains the information of all available NF instances in the core network, the information is not processed by the NRF to provide a complete view of the topology (e.g. interconnections) of all of the NF instances in the core network of the telecommunications network (e.g., a Public Land Mobile Network (PLMN)).

The present disclosure proposes new services provided by the NRF to support a new topology discovery mechanism (may also be referred to as network topology discovery mechanism). The topology discovery mechanism can be used by the management functions to get a real-time view of all of the Network Functions within the core network, and to subscribe to changes in the status of the Network Functions within the core networks, details of which are discussed hereinafter. The new services provided by the NRF are achieved by, e.g., modifying (e.g., enhancing) the functionalities of the NRF beyond what is described in the 5G standard, and by sending additional information (e.g., beyond what is described in 5G standard) from the Network Functions within the core network to the NRF during registration or status update. Details are discussed hereinafter.

FIG. 1 illustrates registration of Network Functions in a core network 100 of a telecommunications network, according to some implementations. In the example of FIG. 1, the core network 100 is a 5G Core Network enhanced for network management. The NRF 110 deployed in the core network 100 is an enhanced NRF that provides new services beyond what is defined in 5G standard (e.g., as described by 3GPP) to support the new topology discovery mechanism. According to some implementations, the NRF 110 is backward compatible, and therefore, performs all functionalities defined in 3GPP TS 29.510 Specification. In addition, the NRF 110 provides new services, such as topology discovery service and topology management service (see, e.g., FIG. 3) to support the topology discovery mechanism. Details of the topology discovery service and topology management service are discussed hereinafter.

FIG. 1 further illustrates some Network Functions deployed in the core network 100. For example, the core network 100 includes Access and Mobility Management Functions (AMFs) 101A and 101B, User Plane Functions (UPFs) 103A and 103B, Session Management Functions (SMFs) 105A and 105B, a Unified Data Management (UDM) 107, and a Policy Control Function (PCF) 109. In the example of FIG. 1, some of the Network Functions are provided by a first vendor (e.g., "Vendor 1"), while other Network Functions are provided by a second vendor (e.g., "Vendor 2"). The number and the type of Network Functions illustrated in FIG. 1 are illustrative and non-limiting. Other numbers and/or other types of Network Functions are also possible, and are fully intended to be included within the scope of the present disclosure. Each of the Network Functions registers with the NRF 110 when the Network Function is deployed, and sends a status update to the NRF 110 when its status changes. In addition, in order to support the new services provided by the NRF 110, each of the Network Functions sends additional information (e.g., information in addition to what is defined in 3GPP TS 29.510 Specification) to the NRF 110 during registration or status update. The additional information sent by the Network Function is discussed hereinafter with reference to FIG. 4.

For example, as defined in 3GPP TS 23.502 Specification, when a Network Function (e.g., 101A/101B, 103A/103B, 105A/105B, 107, or 109) is deployed (e.g., instantiated) in the core network 100, the Network Function registers with the NRF by providing its information (may also be referred to as NF Profile) to the NRF 110, such as the state (e.g., active or non-active), the size, and the location of the Network Function, and the Network Slice to which the Network Function belongs. In addition, the additional information of the Network Function, as illustrated in FIG. 4, is also send to the NRF 110 during registration. The Network Function may also update its status with the NRF 110, e.g., through a heatbeat mechanism by sending a status update to the NRF 110 periodically. The information above about each Network Function is published by the Network Function (e.g., by registering to the NRF 110) to inform about the services it supports. Therefore, the NRF 110 is always updated with the information of the Network Function instances available in the core network 100. In the discussion herein, the terms "Network Function" and "Network Function instance" may be used interchangeably.

The NRF 110 monitors the status of the registered Network Functions by, e.g., monitoring heatbeat messages sent by the registered Network Functions. The information about the registered Network Functions may be used by the different Network Functions within the core network 100 to discover instances of a Network Function of a given type providing a specific service. The Network Function within the core network may also subscribe to changes of the Network Function instances providing the service. The 3GPP TS 23.502 Specification defines process flows that a Network Function can use to discover NF instances providing a given service or subscribe to changes on these instances.

Notably, the NRF 110 (e.g., an enhanced NRF) provides additional services beyond what is defined in 3GPP (e.g., the 3GPP TS 23.502 Specification). In particular, the NRF 110 provides a topology discovery mechanism for the core network 100 (e.g., a 5G Core Network enhanced for network management) by introducing new services provided by the NRF 110. The topology discovery mechanism includes a network topology discovery process for discovering the topology of the core network, and includes a network topology status subscribe and notification process for notifying the management functions of changes in the topology of the core network. Details of the topology discover mechanism are discussed hereinafter. For ease of discussion, the 5G Core Network enhanced for network management (e.g., 100) may also be referred to as an enhanced 5G Core Network, a 5G Topology-Aware Core Network.

The topology discovery mechanism provided by the NRF may be used by any Network Function in the telecommunications network, but particularly by management functions which might be interested in having a real-time view of the topology of the network regardless of the entity deploying or configuring the Network Functions in the core network.

For the particular case of Network Slicing, this new topology discovery mechanism can be used by Network Slice Management Functions (NSMFs) to realize (e.g., know) all of the available Network Function instances that can be used to build a Network Slice Subnet Instance (NSSI) in the core network, regardless of the management functions used to deploy the Network Functions. An example is illustrated in FIG. 2.

Figure 2:
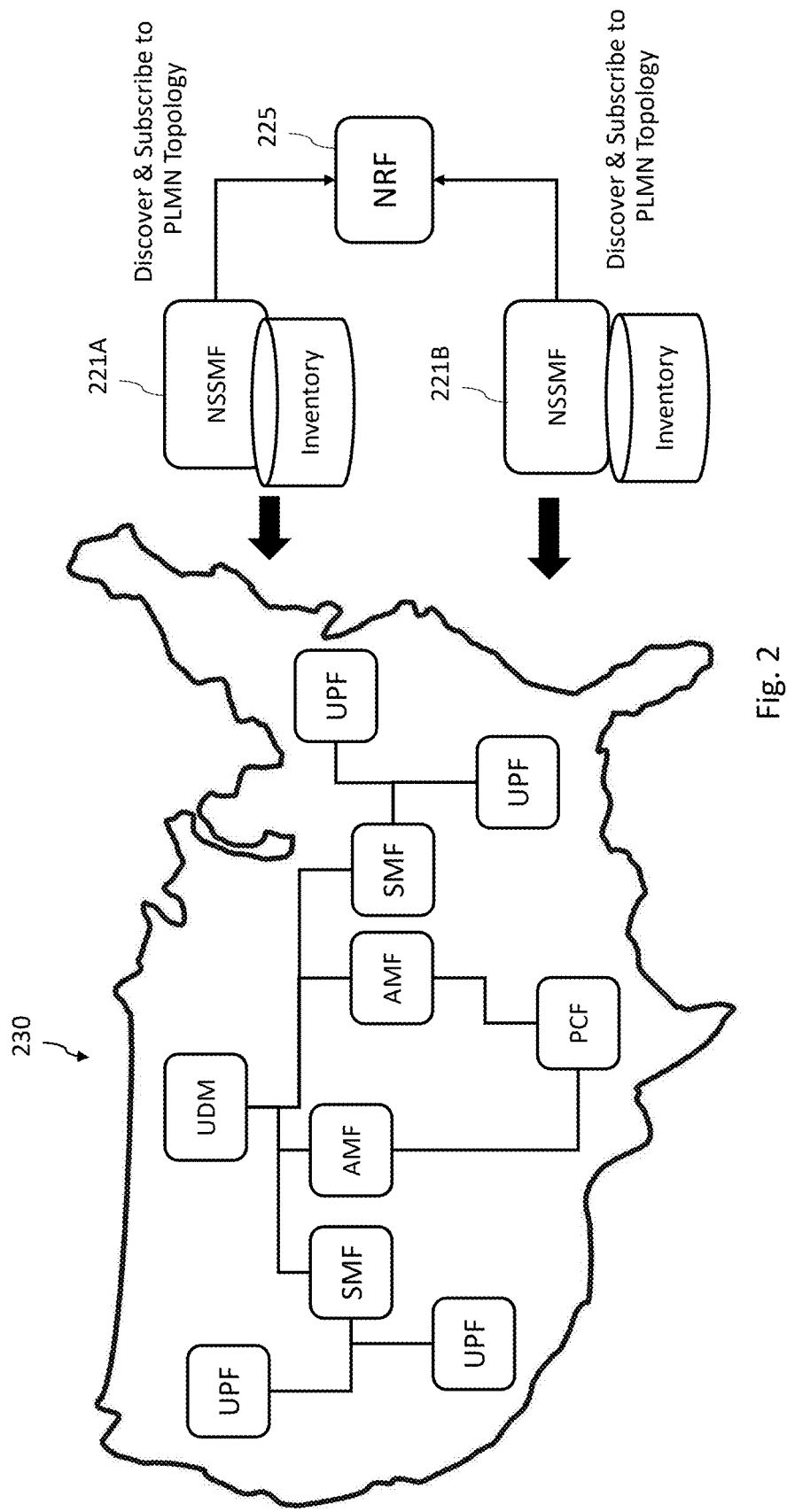
FIG. 2 illustrates a Public Land Mobile Network (PLMN) with a core network that provides a topology discovery mechanism, according to some implementations.

FIG. 2 illustrates application of the topology discovery mechanism for a Public Land Mobile Network (PLMN), according to some implementations. In FIG. 2, a core network 230 (e.g., a 5G Core Network enhanced for network management) of a PLMN includes a plurality of Network Functions already deployed in the core network 230, such as UPFs, SMFs, AMFs, and UDMs. For simplicity, the core network 230 in FIG. 2 only shows some of the Network Functions deployed in the core network. Two management functions, such as an NSSMF 221A and an NSSMF 221B (collectively referred to as NSSMFs 221), are located outside of the core network 230, and intend to build NSSIs in the core network. Each of the NSSMF 221 keeps an inventory of the NFs it deployed. The NSSMFs 221, using the topology discovery mechanism disclosed herein, gather information about all of the existing Network Functions in the core network 230 from an NRF 225. The NRF 225 is an enhanced NRF and corresponds to the NRF 110 in FIG. 1. The NRF 225 provides new services to the management functions to support the topology discovery mechanism. Note that for ease of illustration, the NRF 225 in FIG. 2 is shown outside of the core network 230, within the understanding that the NRF 225 is located inside the core network 230, and is configured to communication with the other Network Functions deployed in the core network 230.

Based on the network topology information provided by the NRF 225, such as information about the types of Network Functions available in the core network 230, the services provided by the Network Functions, and the interconnections between the Network Functions, each of the NSSMFs 221 may decide to use some of the deployed Network Functions to form a respective NSSI in the core network 230. Each of the NSSMFs 221 may also deploy new Network Function(s) in the core network 230, if such Network Function(s) is not already provided by the existing Network Functions in the core network 230 and is needed to form the NSSI. Each of the NSSMFs 221 then build a respective NSSI in the core network 230 using the existing Network Functions and any new Network Function(s) deployed.

As illustrated in the example of FIG. 2, the topology discovery mechanism provided by the NRF 225 allows management functions (e.g., NSSFMs 221) to easily obtain a real-time view of the topology of the core network 230 using services provided by the NRF 225, regardless of which vendor provided which Network Function(s). No vendor-dependent, proprietary polling process between the management functions is needed to obtain the topology information of the core network 230. As a result, efficiency of the management of the telecommunications network is greatly improved.

FIG. 3 illustrates new services provided by the NRF (e.g., 110 or 225) that are used to support the new topology discovery mechanism, according to some implementations. As discussed above, the new services refer to additional services provided by the NRF beyond services defined in 3GPP specifications for NRF. For ease of discussion, the NRF (e.g., 110 or 225) capable of providing the new services may also be referred to as an NRF enhanced for network management, or an enhanced NRF.

FIG. 3 lists the service name, the service operations, the operation semantics and the function of the new services provided by the enhanced NRF. As illustrated in FIG. 3, the new services include a topology discovery service, which is used by the management functions to discover the topology of the core network (e.g., a 5G Topology-Aware Core Network) in a network topology discovery process. The new services also include a topology management service, which is used by the management functions to subscribe/unsubscribe to changes in the topology of the core network, and to receive notification of changes in the topology of the core network in a network topology status subscribe and notification process. Details of the network topology discovery process and the network topology status subscribe and notification process are discussed below with reference to FIGS. 6 and 7. Accordingly to some implementations, the new services provided by the enhanced NRF are used for operation and management purposes only. In other words, the new services are provided by the enhanced NRF to management functions (which are outside of the core network) only, and are not provided to Network Functions inside the core network.

In order to support the new services provided by the enhanced NRF, each Network Function deployed in the core network sends addition information (e.g., information beyond what is defined in 3GPP standard) to the enhanced NRF. In particular, the Network Function Profile described in 3GPP TS 29.510 Specification shall be extended to include the additional information illustrated in FIG. 4.

FIG. 4 illustrates the additional information sent from each of the Network Functions to the enhanced NRF in order to support the new services provided by the enhanced NRF, according to some implementations. The additional information shall be provided to the enhanced NRF by each Network Function in the core network as part of its service registration procedure described in Chapter 4.17.1 in 3GPP TS 23.502 Specification, and an update will be sent to the enhanced NRF whenever this information is changed following the update procedure described in Chapter 4.17.2 in 3GPP TS 23.502 Specification.

The additional information illustrated in FIG. 4 are provided to the management function executing the new topology discovery operation and are included as part of the new topology status notification whenever they are updated.

In FIG. 4, the Management IP Endpoints information includes an IP address(es) and a port number of the NF that can be used to manage the NF. The Management FQDN(s) information is an alternative to the Management IP Endpoint(s) information, and includes the Fully Qualified Domain Name (FQDN) information (e.g., a hostname and a domain name) of the NF. The Management IP Endpoint(s) and the Management FQDN(s) will be used by a management function to perform an O&M operation on this Network Function instance, hence a management function discovering the topology of the network will be able to operate on the discovered Network Functions.

In FIG. 4, the Connected NF Instances information includes identifiers of other existing NFs that are deployed in the core network and connected to the NF. The Connected NF Instances information will be used by the management function to understand which of the Network Functions in the network topology are already connected. The introduction of this new information element not only allows the enhanced NRF to provide information of each individual NF, but also allows the enhanced NRF to provide connectivity status of each NF with the rest of the core network. This way the enhanced NRF can store, and provide in the notification status, the network connectivity of all NFs and not only isolated status of each NF. According to some implementations, the enhanced NRF uses the Connected NF Instances to generate the information regarding the interconnections of the NFs in the core network, as illustrated in FIG. 5.

Figure 5:
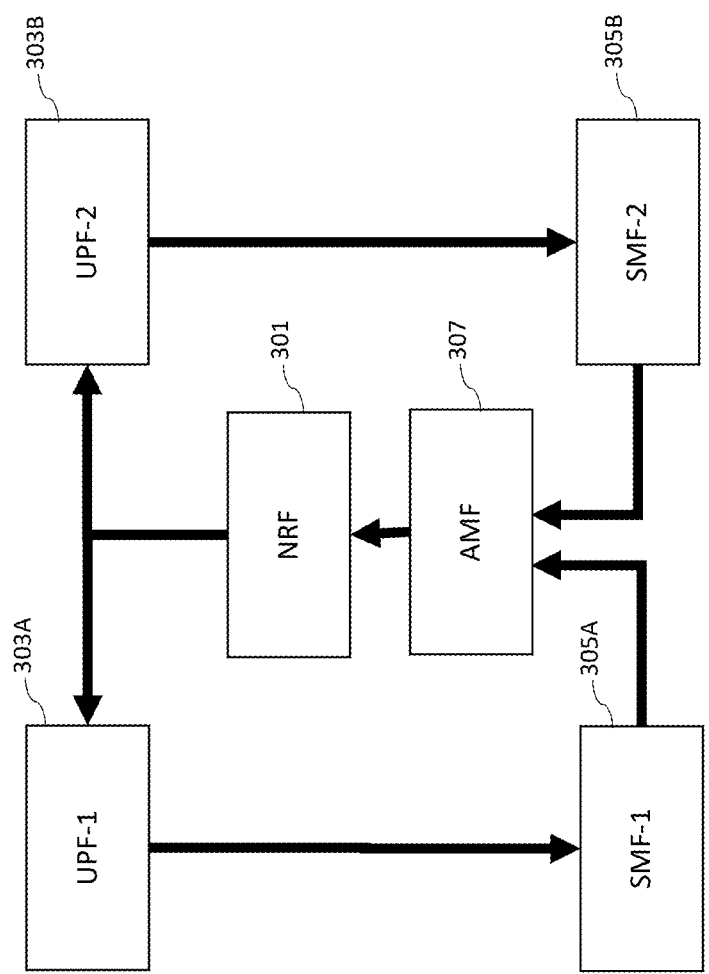
FIG. 5 illustrates interconnections among the Network Functions within a core network of a telecommunication network, according to some implementations.

FIG. 5 illustrates the interconnections among the Network Functions within the core network (e.g., a 5G Topology-Aware Core Network) generated by the enhanced NRF, according to some implementations. In the example of FIG. 5, the core network includes an enhanced NRF 301 and plurality of NFs registered with the enhanced NRF 301, such as UPFs 303A and 303B, SMFs 305A and 305B, and an AMF 307. Based on the Connected NF Instances information provided by each of the registered NFs, the enhanced NRF 301 generates a graph showing the interconnections among all of the NFs as illustrated in FIG. 5. The interconnection information in FIG. 5 offers a clear, high-level view of how the NFs are interconnected in the core network. According to some implementations, the interconnection information of the NFs is stored and transmitted in JSON format per JSON Schema definition (https://json-schema.org/).

Figure 6:
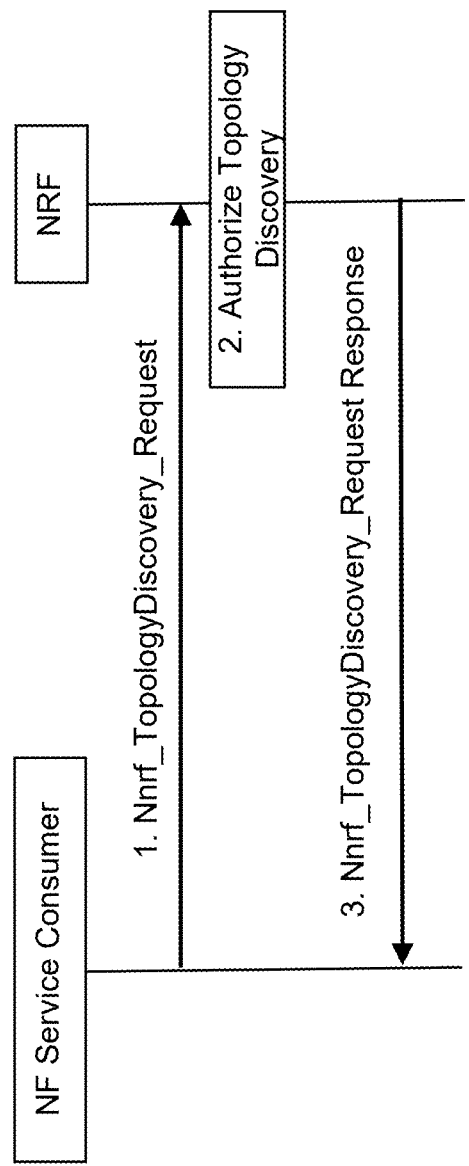
FIG. 6 illustrates a network topology discovery process, according to some implementations.

FIG. 6 illustrates a network topology discovery process, according to some implementations. In particular, FIG. 6 illustrates a process flow supported by the enhanced NRF and management functions to discover network topology.

In FIG. 6, the NF service consumer is normally an O&M function (e.g., a management function) that intends to discover the topology of a core network (e.g., a 5G Topology-Aware Core Network) of a given PLMN. In step 1 of FIG. 6, the NRF (e.g., an enhanced NRF) receives an topology discovery request (e.g., through an Nnrf_TopologyDiscovery_Request message) from the NF service consumer. As discussed above, each Network Function, when deployed in the core network, registers with the enhanced NRF. Therefore, the enhanced NRF has information of all of the deployed Network Functions in the core network. In addition, as discussed above, the enhanced NRF processes the Connected NF Instances information from all of the deployed Network Functions, and generate information regarding the topology of (e.g., interconnections among) the deployed Network Functions in the core network.

Next, in step 2, the enhanced NRF authorizes the topology discovery request. The enhanced NRF determines whether the NF service consumer is allowed to discover the topology of the core network based on an authorization procedure (e.g., an authorization procedure for Service Based Interface (SBI) services) of the core network, according to some implementations. For example, 3GPP TS 33.501 Specification defines an authorization framework for a Network Function to authorize the requests coming from any other function (including subscriptions). This authorization framework is based on the OAuth 2.0 mechanism defined by IETF in RFC 6749. As another example, the authorization procedure may use an API Authorization using TLS Certificates as describe in the Authorization and Authentication section of the ETSI EG 203 647 Specification.

Next, in step 3, if the enhanced NRF determines that the NF service consumer is allowed to discover the topology of the core network, the enhanced NRF sends a response to the NF service consumer, where the response comprises information regarding each of the NFs in the core network and the interconnections between the NFs in the core network. For example, the response may include at least the following information: the set of NF instances in the core network, their types, their status (e.g. active/suspended), the Network Slice information, their locations, capacities, load, and other information related to how to address those instances (e.g. whether indirect communication is needed). In addition, the response may include information regarding the interconnections among all of the NFs in the core network.

Figure 7:
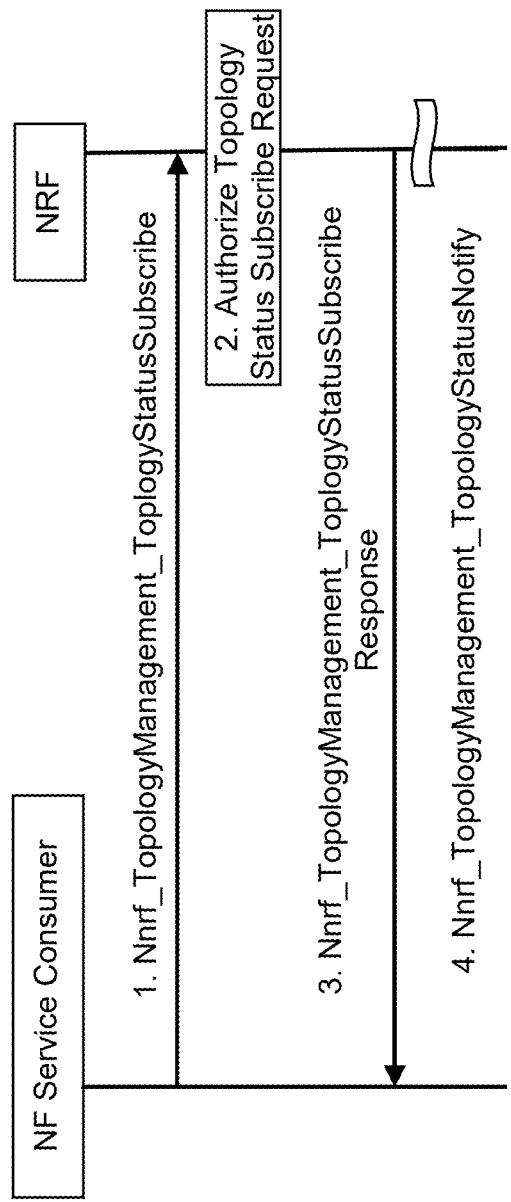
FIG. 7 illustrates a network topology status subscribe and notification process, according to some implementations.

FIG. 7 illustrates a network topology status subscribe and notification process, according to some implementations. The process flow in FIG. 7 is supported by the enhanced NRF and O&M functions, and is used by the O&M functions (e.g., management functions) to subscribe/unsubscribe to topology status update of the core network (e.g., a 5G Topology-Aware Core Network), and to receive notification of changes in the topology of the core network, according to some implementations.

In FIG. 7, in step 1, the NF service consumer (e.g., an O&M function) subscribes to be notified of newly registered/updated/deregistered NF instances in the core network (e.g., a 5G Topology-Aware Core Network) of a given PLMN. The NF service consumer sends a request to subscribe to topology status update (e.g., through an Nnrf_TopologyManagement_TopologyStatusSubscribe Request message) to the enhanced NRF, and the enhanced NRF receives the request from the NF service consumer.

Next, in step 2, the enhanced NRF authorizes the topology status update request based on the authorization procedure of the core network. Details of the authorization procedure may be the same as or similar to those discussed above in FIG. 6, thus not repeated here. The enhanced NRF determines whether the NF service consumer is allowed to subscribe to topology status update of the core network based on the authorization procedure of the core network.

Next, in step 3, if the enhanced NRF determines that the NF service consumer is authorized to subscribe to topology status update, the enhanced NRF acknowledges the execution of Nnrf_TopologyManagement_TopologyStatusSubscribe Request by sending a response to the NF service consumer. For example, the enhanced NRF sends an Nnrf_TopologyManagement_TopologyStatusSubscribe Response message to the NF service consumer.

The enhanced NRF monitors the status of the NFs in the core network to detect any topology status change in the core network. Accordingly to some implementations, the topology status change in the core network includes: registration of a newly deployed NF to the enhanced NRF, change in an existing NF registered to the enhanced NRF, or deregistration of an NF previously registered to the enhanced NRF. According to some implementations, each of the NFs in the core network updates its status with the enhanced NRF through a heatbeat mechanism by sending a status update to the enhanced NRF periodically. In response to a topology status change in the core network, the enhanced NRF sends a topology status update message to each NF service consumer subscribing to the topology status update, as illustrated in step 4 of FIG. 7.

In step 4, in response to a topology status change in the core network, the enhanced NRF notifies newly registered/updated/deregistered NF instances to the subscribed NF service consumer by sending an Nnrf_TopologyManagement_TopologyStatusNotify message. According to some implementations, in response to a topology status change in the core network, the enhanced NRF also generates an updated interconnection information for all of the NFs in the core network, and the updated interconnection information is sent to the NF service consumer as part of the Nnrf_TopologyManagement_TopologyStatusNotify message.

The NF service consumer can unsubscribe to topology status update of the core network, and stop receiving notification of changes in the topology of the core network. This may be achieved by sending an Nnrf_TopologyManagement_TopologyStatusUnSubscribe Request to the enhanced NRF. The enhanced NRF authorized the request for unsubscription. Once approved, the enhanced NRF send an acknowledgement message to the NF service consumer. The process is similar to the topology status update subscription process discussed above, thus details are not discussed here.

Figure 8:
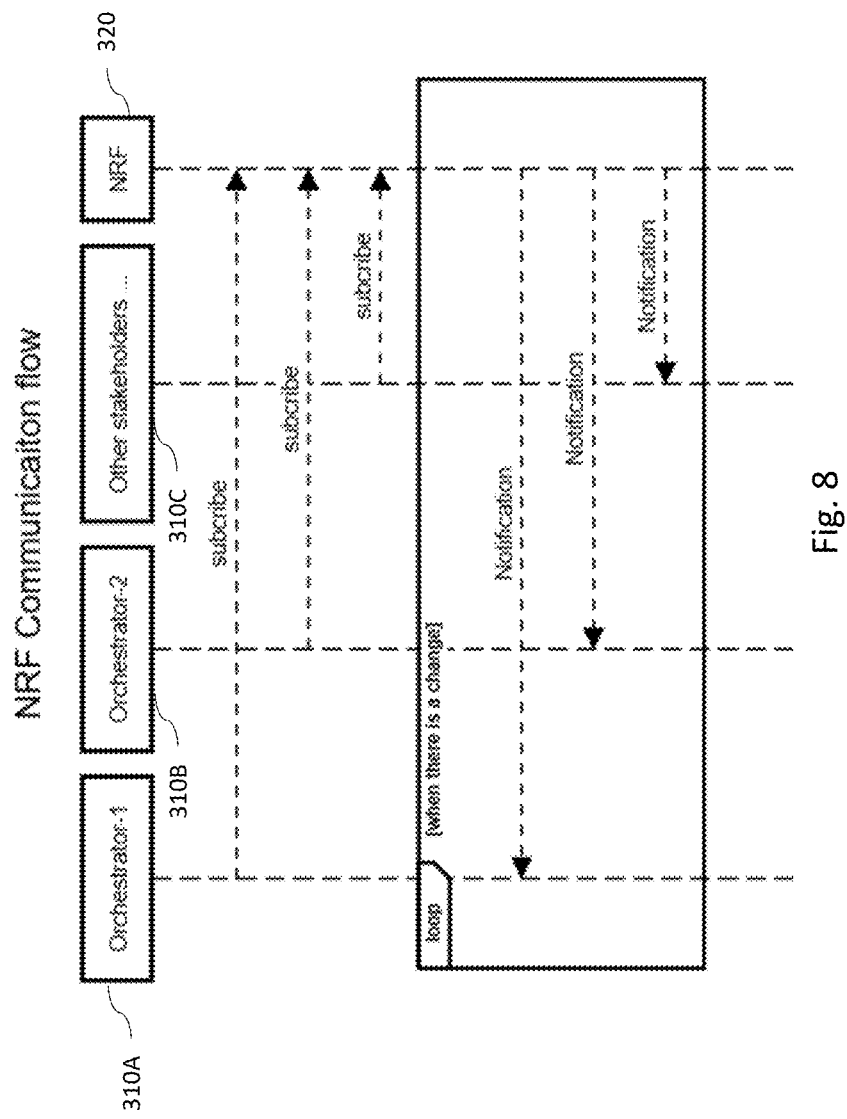
FIG. 8 illustrates the communication flow with the enhanced NRF, according to some implementations.

FIG. 8 illustrates the communication flow with the enhanced NRF, according to some implementations. In FIG. 8, a plurality of management functions 310 (e.g., 310A, 310B, and 310C) and an enhanced NRF 320 are shown. The management functions 310 all subscribe to topology status update of the core network from the enhanced NRF 320, using the network topology status subscribe and notification process of FIG. 7. When there is a change in the topology of the core network, the enhanced NRF 320 sends notification messages to each of the management functions 310. The disclosed communication flow greatly simplifies the communication between the management functions 310 and the enhanced NRF 320. For example, the disclosed topology status update mechanism allows the management functions to automatically receive updated topology status only when there is a change in the topology status, no periodically polling of the NRF or synchronization of inventory with other management functions is needed.

As discussed above, with the new services provided by the enhanced NRF to support the topology discovery mechanism, the O&M functions can have a view of the network topology in real-time without the need to synchronize their inventory with other management functions. Without the disclosed topology discovery mechanism, methods for synchronizing the inventory of different management functions provided by different vendors may be proprietary, cumbersome, and error-prone, because such methods may depend on vendor specific implementations, and may involve polling the management functions provided by all of the vendors through proprietary polling procedures. In contrast, the disclosed topology discovery mechanism allows management functions to obtain real-time view of the network topology easily through services provided by the enhanced NRF, and therefore, no error-prone, complicated proprietary procedures for synchronizing the inventory with other management functions are needed. The efficiency of managing the network is greatly improved, and the richness of information received by the management functions is also improved.

Figure 9:
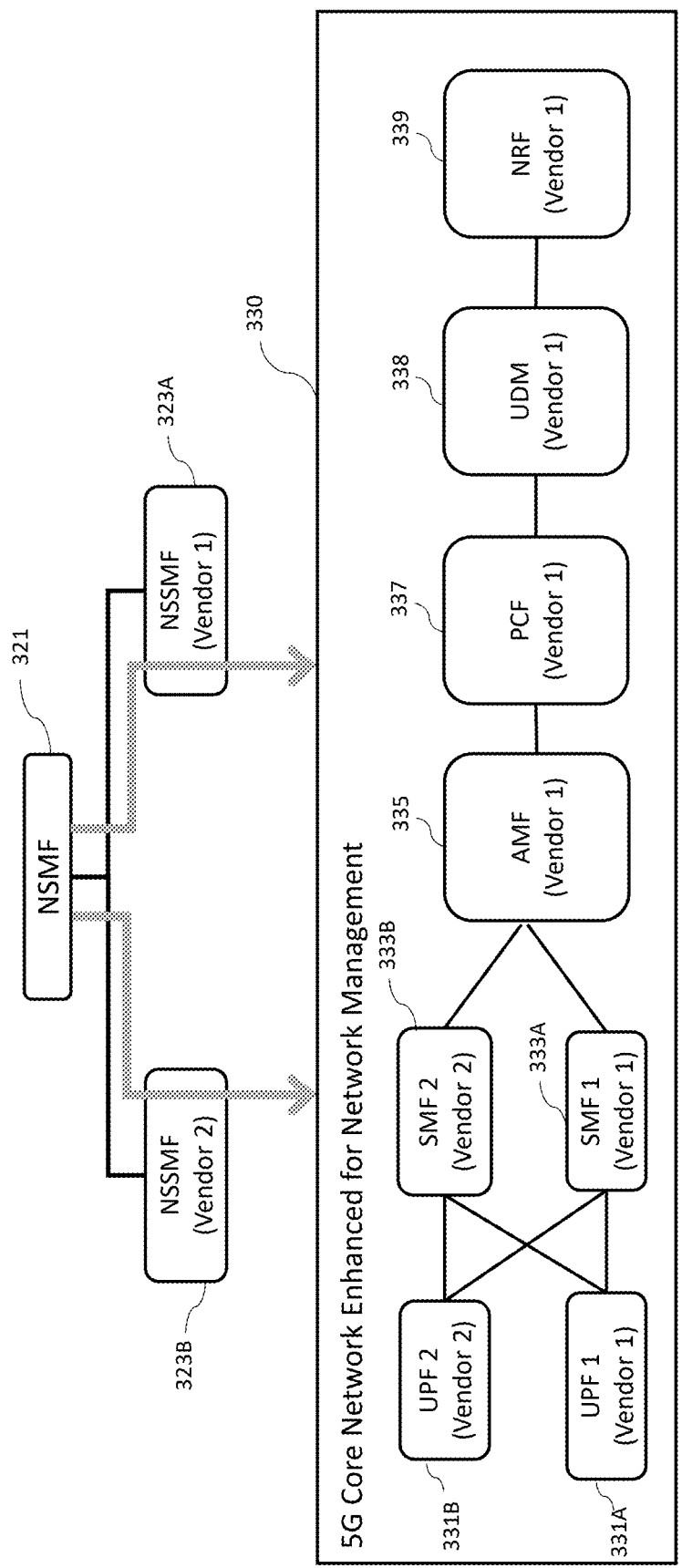
FIG. 9 illustrates allocation of Network Slices in a core network by Network Slice Subnet Management Functions (NSSMFs), according to some implementations.

FIG. 9 illustrates allocation of Network Slices in a 5G Core Network enhanced for network management by Network Slice Subnet Management Functions (NSSMFs), according to some implementations. In the example of FIG. 9, the telecommunications network includes two different NSSMFs 323A and 323B provided by two different vendors (e.g., vendor 1 and vendor 2). To allocate Network Slices, an NSMF 321 of the telecommunications network calls the NSSMFs 323A and 323B. The NSSMFs 323A and 323B then make decisions to deploy and configure Network Functions in the core network 330 (e.g., a 5G Core Network enhanced for network management). Note that the NSMF 321, the NSSMF 323A, and the NSSMF 323B are management functions disposed outside the core network 330, and manage the Network Functions deployed inside the core network 330.

In the example of FIG. 9, the NSSMF 323A from vendor 1 deploys the following Network Functions in the core network 330: a UPF 331A, an SMF 333A, an AFM 335, a PCF 337, an UDM 338, and an enhanced NRF 219 that supports the topology discovery mechanism. The NSSMF 323B from vendor 2 deploys the following Network Functions in the core network 330: a UPF 331B and an SMF 333B. In FIG. 9, each of the Network Functions in the core network 330 has a respective text notation (e.g., "vendor 1" or "vendor 2") to indicate which NSSMF deployed the Network Function. Notably, through the topology discovery mechanism supported by the enhanced NRF 339, the NSSMFs 323A and 323B could easily get real-time view of the topology of the core network 330, and deploy and configure Network Functions in the core network 330 to form respective NSSIs.

Figure 10:
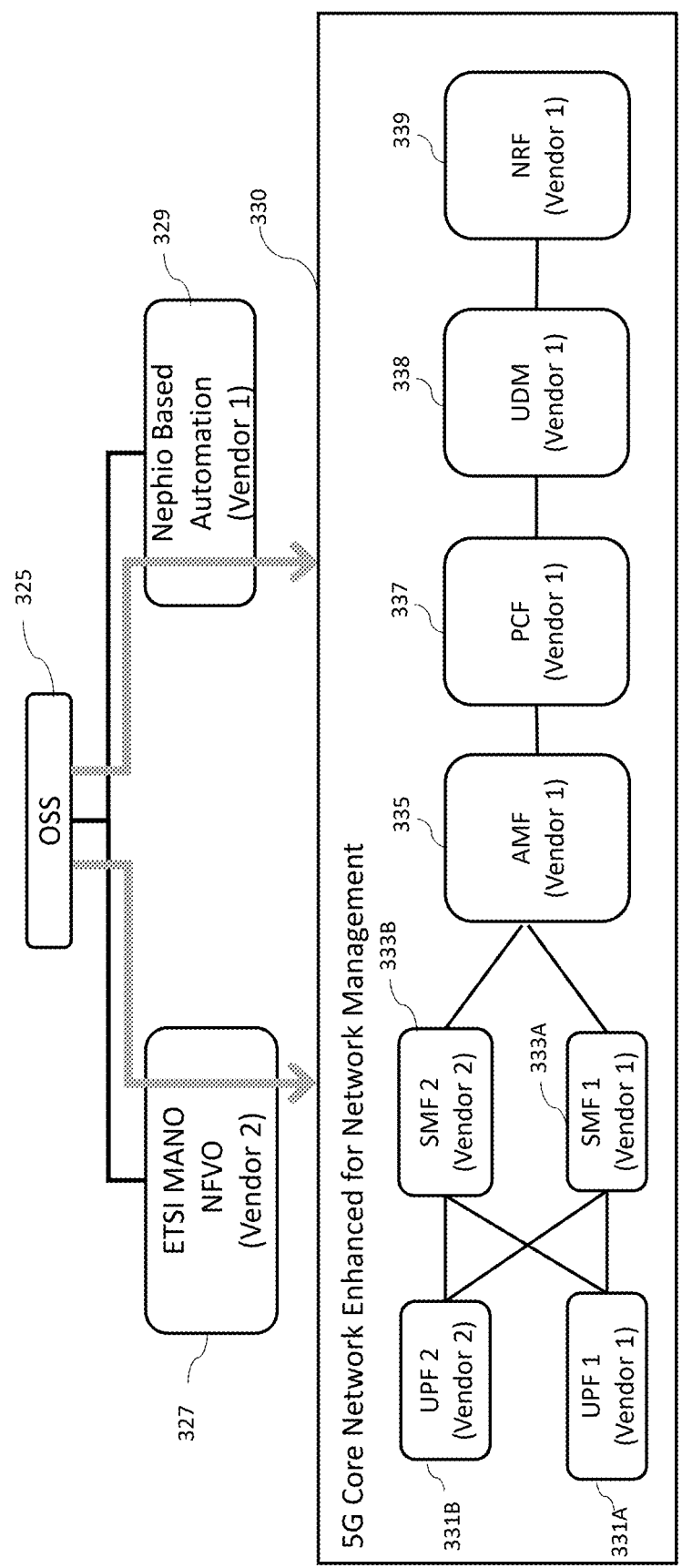
FIG. 10 illustrates allocation of Network Slices in a core network by Network Functions from different standards, according to some implementations.

FIG. 10 illustrates allocation of Network Slices in a 5G Core Network enhanced for network management by an ETSI MANO NFVO 327 and a Nephio Based Automation Function 329, according to some implementations. As illustrated in the example of FIG. 10, in the same telecommunications network, an ETSI MANO NFVO 327 and a Nephio Based Automation Function 329 are used by an OSS 205 to deploy different types of Network Functions in the core network 330. Similar to FIG. 9, through the topology discovery mechanism supported by the enhanced NRF 339, the ETSI MANO NFVO 327 and the Nephio Based Automation Function 329 could easily get real-time view of the topology of the core network 330, and deploy and configure Network Functions in the core network 330 to form respective NSSIs.

Figure 11:
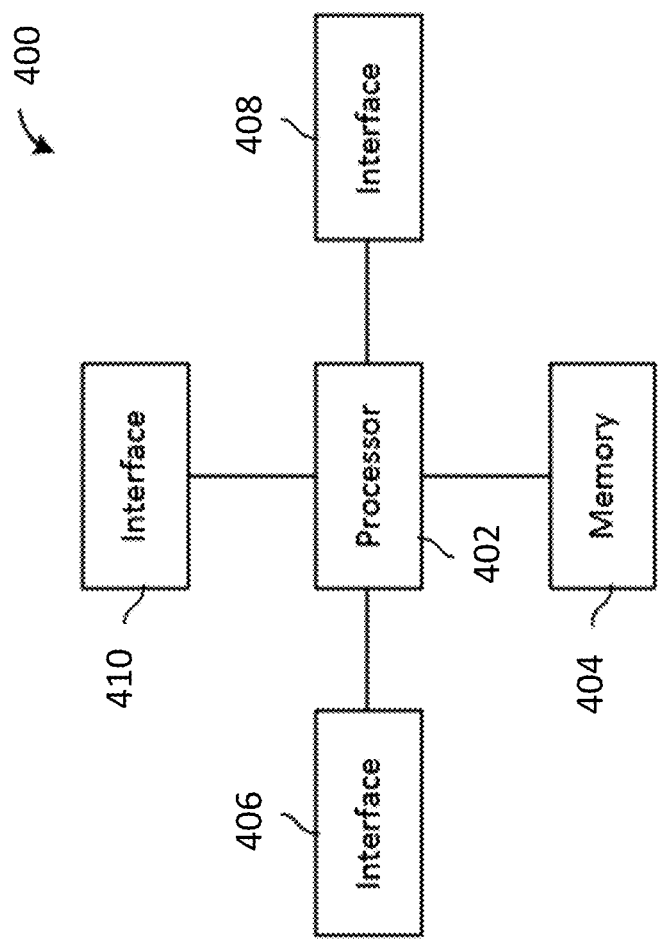
FIG. 11 illustrates a processing system for implementing the Network Functions of a telecommunications network, according to some implementations.

FIG. 11 illustrates a processing system 400 for implementing the Network Functions of a telecommunications network, according to some implementations. The processing system 400 may be used to run one or more of the virtualized or containerized Network Functions of the telecommunications networks. For example, the processing system 400 may be used to implement the enhanced NRF, or at least a portion of the core network.

As shown, the processing system 400 includes a processor 402, a memory 404, and interfaces 406-410, which may (or may not) be arranged as shown in FIG. 11. The processor 402 may be any component or collection of components adapted to perform computations and/or other processing related tasks, and the memory 404 may be any component or collection of components adapted to store programming and/or instructions for execution by the processor 402. In an embodiment, the memory 404 includes a non-transitory computer readable medium. The interfaces 406, 408, 410 may be any component or collection of components that allow the processing system 400 to communicate with other devices/components and/or a user. For example, one or more of the interfaces 406, 408, 410 may be adapted to communicate data, control signal, or management messages from the processor 402 to applications installed on another device. As another example, one or more of the interfaces 406, 408, 410 may be adapted to allow a user or user device (e.g., personal computer (PC), a server, etc.) to interact/communicate with the processing system 400. The processing system 400 may include additional components not depicted in FIG. 11, such as long-term storage (e.g., non-volatile memory, etc.).

According to some implementations, the processing system 400 is included in a network device that is accessing, or part otherwise of, a telecommunications network. In one example, the processing system 400 is in a network-side device in a wireless or wireline telecommunications network, such as a base station, a relay station, a scheduler, a controller, a gateway, a router, an applications server, or any other device in the telecommunications network. According to some other implementations, the processing system 400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
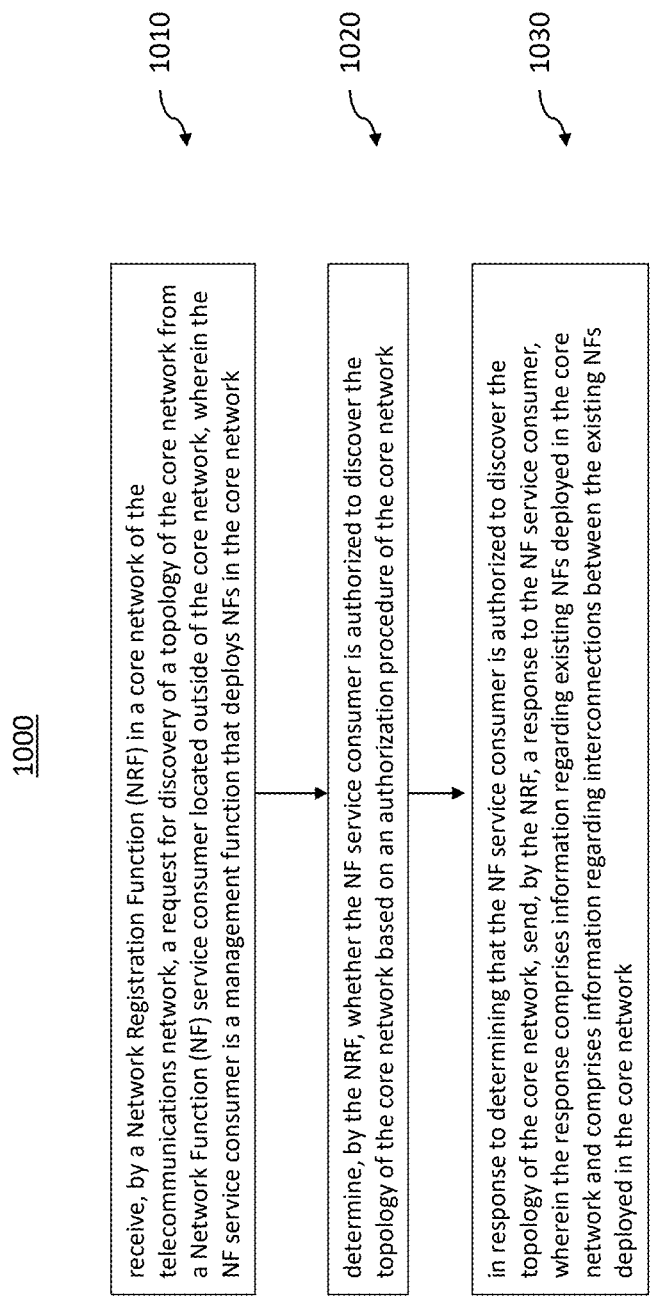
FIG. 12 illustrates a flow chart of a method of operating a telecommunications network, according to some implementations.

FIG. 12 illustrates a flow chart of a method of operating a telecommunications network, according to some implementations. It should be understood that the embodiment method shown in FIG. 12 is merely an example of many possible embodiment methods. One of ordinary skill in the art would recognize many variations, alternatives, and modifications. For example, various steps as illustrated in FIG. 12 may be added, removed, replaced, rearranged, or repeated.

Referring to FIG. 12, at block 1010, a Network Registration Function (NRF) in a core network of the telecommunications network receives a request for discovery of a topology of the core network from a Network Function (NF) service consumer located outside of the core network, wherein the NF service consumer is a management function that deploys NFs in the core network. The NRF is an enhanced NRF that provides new services to support network topology discovery and network topology status update. In block 1020, the NRF determines whether the NF service consumer is authorized to discover the topology of the core network based on an authorization procedure of the core network. In block 1030, in response to determining that the NF service consumer is authorized to discover the topology of the core network, the NRF sends a response to the NF service consumer, wherein the response comprises information regarding existing NFs deployed in the core network and comprises information regarding interconnections between the existing NFs deployed in the core network.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A telecommunications network comprising:
   a core network comprising:
      a first plurality of hardware-based Network Functions (NFs); and
      a Network Registration Function (NRF) configured to communicate with the first plurality of NFs, wherein the first plurality of NFs are registered with the NRF, and the NRF is configured to:
         receive, from an NF service consumer located outside of the core network, a request for discovery of a topology of the core network;
         determine, based on an authorization procedure of the core network, whether the NF service consumer is authorized to discover the topology of the core network; and
         send, in response to determining that the NF service consumer is authorized to discover the topology of the core network, a response to the NF service consumer, wherein the response comprises information regarding each of the first plurality of NFs and interconnections between the first plurality of NFs.

2. The telecommunications network of claim 1, wherein each NF of the first plurality of NFs is configured to, during registration:
   send an IP address and a port number of the each NF to the NRF, wherein the each NF is configured to be managed through the IP address and the port number;
   send a hostname and a domain name of the each NF to the NRF; and
   send, to the NRF, identifiers of other existing NFs that are in the core network and connected to the each NF.

3. The telecommunications network of claim 2, wherein the NRF is configured to generate the information regarding the interconnections between the first plurality of NFs based on the identifiers sent from each NF of the first plurality of NFs.

4. The telecommunications network of claim 3, wherein the NF service consumer is a management function of the telecommunications network that deploys and configures NFs in the core network.

5. The telecommunications network of claim 4, further comprising the NF service consumer, wherein the NF service consumer is configured to:
based on the response from the NRF, determine a second plurality of NFs to be deployed in the core network;
deploy the second plurality of NFs in the core network; and
form a Network Slice Subnet Instance (NSSI) using the second plurality of NFs and at least some of the first plurality of NFs.

6. The telecommunications network of claim 3, wherein the telecommunication network is a Public Land Mobile Network (PLMB), the core network is a Fifth-Generation (5G) Core Network enhanced for network management, and the first plurality of NFs represent all of the existing NFs deployed within the core network.

7. The telecommunications network of claim 2, wherein the NRF is further configured to:
receive, from the NF service consumer, a request for subscription to topology status update;
determine, based on the authorization procedure of the core network, whether the NF service consumer is authorized to subscribe to topology status update; and
in response to determining that the NF service consumer is authorized to subscribe to topology status update, send an acknowledgement of the request for subscription to the NF service consumer.

8. The telecommunications network of claim 7, wherein the NRF is further configured to, in response to a topology status change in the core network, send a topology status update message to the NF service consumer.

9. The telecommunications network of claim 8, wherein the topology status change in the core network includes registration of a newly deployed NF to the NRF, change in an existing NF registered to the NRF, or deregistration of an NF previously registered to the NRF.

10. The telecommunications network of claim 8, wherein each of the first plurality of NFs is configured to send a respective status update to the NRF using a heatbeat mechanism.

11. A method of operating a telecommunications network, the method comprising:
receiving, by a Network Registration Function (NRF) in a core network of the telecommunications network, a request for discovery of a topology of the core network from a Network Function (NF) service consumer located outside of the core network, wherein the NF service consumer is a management function that deploys NFs in the core network;
determining, by the NRF, whether the NF service consumer is authorized to discover the topology of the core network based on an authorization procedure of the core network; and
send, by the NRF, in response to determining that the NF service consumer is authorized to discover the topology of the core network, a response to the NF service consumer, wherein the response comprises information regarding NFs deployed in the core network and comprises information regarding interconnections between the NFs deployed in the core network.

12. The method of claim 11, further comprising, before receiving the request for discovery of the topology of the core network:
sending, by each NF of the NFs deployed in the core network, an IP address and a port number of the each NF to the NRF, wherein the each NF is configured to be managed through the IP address and the port number;
sending, by the each NF, a hostname and a domain name of the each NF to the NRF; and
sending, by the each NF, identifiers of other NFs connected to the each NF to the NRF.

13. The method of claim 12, further comprising, before receiving the request for discovery of the topology of the core network:
generating, by the NRF, the information regarding the interconnections between the NFs deployed in the core network based on the identifiers sent from each of the NFs deployed in the core network.

14. The method of claim 13, further comprising:
receiving, by the NRF, a request for subscription to topology status update from the NF service consumer;
determining, by the NRF, whether the NF service consumer is authorized to subscribe to topology status update based on the authorization procedure of the core network; and
in response to determining that the NF service consumer is authorized to subscribe to topology status update, sending, by the NRF, an acknowledgement of the request for subscription to the NF service consumer.

15. The method of claim 14, further comprising:
in response to a topology status change in the core network, sending, by the NRF, a topology status update message to the NF service consumer, wherein the topology status change in the core network includes registration of a newly deployed NF to the NRF, change in an existing NF registered to the NRF, or deregistration of an NF previously registered to the NRF.

16. A core network of a telecommunications network, the core network comprising:
a first plurality of hardware based Network Functions (NFs); and
a Network Registration Function (NRF) configured to communicate with the first plurality of NFs, wherein the first plurality of NFs are registered with the NRF, and the NRF is configured to:
receive, from an NF service consumer located outside of the core network, a request for discovery of a topology of the core network, wherein the NF service consumer is a management function that deploys NFs in the core network;
determine, based on an authorization procedure of the core network, whether the NF service consumer is authorized to discover the topology of the core network; and
send, in response to determining that the NF service consumer is authorized to discover the topology of the core network, a response to the NF service consumer, wherein the response comprises information regarding each of the first plurality of NFs and interconnections between the first plurality of NFs.

17. The core network of claim 16, wherein the NRF is further configured to:
receive, from the NF service consumer, a request for subscription to topology status update;

determine, based on the authorization procedure of the core network, whether the NF service consumer is authorized to subscribe to topology status update; and in response to determining that the NF service consumer is authorized to subscribe to topology status update, send an acknowledgement of the request for subscription to the NF service consumer.

18. The core network of claim 17, wherein the NRF is further configured to, in response to a topology status change in the core network, send a topology status update message to the NF service consumer, wherein the topology status change in the core network includes registration of a newly deployed NF to the NRF, change in an existing NF registered to the NRF, or deregistration of an NF previously registered to the NRF.

19. The core network of claim 16, wherein each NF of the first plurality of NFs is configured to, during registration:

send an IP address and a port number of the each NF to the NRF, wherein the each NF is configured to be managed through the IP address and the port number;

send a hostname and a domain name of the each NF to the NRF; and send, to the NRF, identifiers of other existing NFs that are deployed in the core network and connected to the each NF.

20. The telecommunications network of claim 19, wherein the NRF is configured to generate the information regarding the interconnections between the first plurality of NFs based on the identifiers sent from each NF of the first plurality of NFs.

* * * * *